United States Patent
Hiei et al.

(10) Patent No.: US 11,623,647 B2
(45) Date of Patent: Apr. 11, 2023

(54) DRIVER AND VEHICLE MONITORING FEEDBACK SYSTEM FOR AN AUTONOMOUS VEHICLE

(71) Applicant: TOYOTA MOTOR ENGINEERING & MANUFACTURING NORTH AMERICA, INC., Erlanger, KY (US)

(72) Inventors: Yu Hiei, Northville, MI (US); Rini Sherony, Ann Arbor, MI (US); Tina Brunetti Sayer, Ann Arbor, MI (US); Joshua E. Domeyer, Ann Arbor, MI (US); John Marcoux, Ypsilanti, MI (US); Miles J. Johnson, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 126 days.

(21) Appl. No.: 15/335,533

(22) Filed: Oct. 27, 2016

(65) Prior Publication Data

US 2018/0118219 A1 May 3, 2018

(51) Int. Cl.
*B60W 40/00* (2006.01)
*B60W 40/09* (2012.01)
*B60W 50/14* (2020.01)

(52) U.S. Cl.
CPC ............ *B60W 40/09* (2013.01); *B60W 50/14* (2013.01); *B60W 2540/22* (2013.01)

(58) Field of Classification Search
CPC ... B60W 40/09; B60W 50/14; B60W 2540/22
See application file for complete search history.

(56) References Cited

U.S. PATENT DOCUMENTS

| | | | |
|---|---|---|---|
| 8,738,262 B2 | 5/2014 | Syed et al. | |
| 8,903,591 B1 * | 12/2014 | Ferguson | G05D 1/0274 701/25 |
| 8,972,161 B1 * | 3/2015 | Koebler | B60L 7/12 701/123 |
| 9,007,198 B2 * | 4/2015 | Gunaratne | G08G 1/163 340/439 |
| 9,082,308 B2 | 7/2015 | Armitage et al. | |

(Continued)

FOREIGN PATENT DOCUMENTS

| | | |
|---|---|---|
| DE | 10 2009 047 432 A1 | 6/2011 |
| JP | 2008-250492 | 10/2008 |
| WO | WO 2010/138060 A1 | 12/2010 |

*Primary Examiner* — Truc M Do
(74) *Attorney, Agent, or Firm* — Oblon, McClelland, Maier & Neustadt, L.L.P.

(57) ABSTRACT

A feedback server includes a processing circuitry configured to determine an actual driving performance of a driver in a manual driving mode and a projected driving performance if the vehicle had been operated in an autonomous driving mode, compare the driving performance in the manual driving mode and the autonomous driving mode, and transmit a feedback to the driver based on the comparison. The processing circuitry can be further configured to determine a driver state of the driver in the manual driving mode, determine environmental driving condition of the vehicle, and establish a baseline behavior of the driver as a function of the driver state and the environmental driving condition.

17 Claims, 5 Drawing Sheets

(56) References Cited

U.S. PATENT DOCUMENTS

| | | | |
|---|---|---|---|
| 9,189,897 B1 * | 11/2015 | Stenneth | G07C 5/008 |
| 9,566,986 B1 * | 2/2017 | Gordon | B60W 50/12 |
| 9,688,283 B2 * | 6/2017 | Armitage | B60K 35/00 |
| 9,718,471 B2 * | 8/2017 | Gordon | B60W 30/16 |
| 9,721,397 B2 * | 8/2017 | Gordon | G07B 15/06 |
| 9,731,726 B2 * | 8/2017 | Gordon | B60W 40/08 |
| 9,751,532 B2 * | 9/2017 | Gordon | H04W 4/046 |
| 9,785,145 B2 * | 10/2017 | Gordon | G05D 1/0061 |
| 10,029,701 B2 * | 7/2018 | Gordon | B60W 50/12 |
| 2008/0255722 A1 * | 10/2008 | McClellan | B60R 25/102 |
| | | | 701/31.4 |
| 2009/0326753 A1 * | 12/2009 | Chen | G09B 9/04 |
| | | | 701/31.4 |
| 2012/0083960 A1 * | 4/2012 | Zhu | G05D 1/0276 |
| | | | 701/23 |
| 2013/0052614 A1 | 2/2013 | Mollicone et al. | |
| 2014/0125474 A1 * | 5/2014 | Gunaratne | G08G 1/163 |
| | | | 340/439 |
| 2015/0066284 A1 * | 3/2015 | Yopp | B60W 30/00 |
| | | | 701/29.2 |
| 2015/0112546 A1 | 4/2015 | Ochsendorf et al. | |
| 2015/0161913 A1 | 6/2015 | Dominguez et al. | |
| 2015/0175168 A1 | 6/2015 | Hoye et al. | |
| 2015/0232065 A1 * | 8/2015 | Ricci | G07C 5/02 |
| | | | 701/36 |
| 2015/0314780 A1 * | 11/2015 | Stenneth | B60W 30/00 |
| | | | 701/23 |
| 2015/0336587 A1 | 11/2015 | Inoue et al. | |
| 2016/0001781 A1 * | 1/2016 | Fung | B60K 28/02 |
| | | | 701/36 |
| 2016/0026182 A1 * | 1/2016 | Boroditsky | H04L 67/306 |
| | | | 701/23 |
| 2016/0363935 A1 * | 12/2016 | Shuster | G08G 1/163 |
| 2017/0106876 A1 * | 4/2017 | Gordon | B60W 50/082 |
| 2017/0166222 A1 * | 6/2017 | James | B60W 50/14 |

* cited by examiner

DRIVER AND VEHICLE MONITORING FEEDBACK SYSTEM FOR AN AUTONOMOUS VEHICLE

FIELD OF THE DISCLOSURE

This application relates generally to improvements in autonomous vehicles. More particularly the present disclosure relates to providing performance feedback to a driver of an autonomous vehicle post driving, as well as real-time recommendations to switch to an autonomous driving mode.

DESCRIPTION OF THE RELATED ART

Modern vehicles are equipped with driver assistance technology and a set of sensors such as video sensors like camera, audio sensors, accelerometers, gyroscopes, vehicle state sensors, GPS (global positioning system), etc. The sensor data can be used to determine control actions such as automated braking, cruise control, etc. The sensor data can be recorded and further used to determine the occurrence of an anomalous driving event. Further, the recorded information can be used to determine driving performance by reviewing these event.

Further, modern vehicles are expected to be highly automated and may be safely driven with limited to no human assistance. Such vehicles are also referred to as autonomous vehicles. Highly automated vehicles may be equipped with sensors (e.g., radar sensors) that sense the environment of the vehicle as it is in motion. Moreover, autonomous vehicles may navigate without human input using advanced navigation systems. However, even with high degree of automation, human intervention play still be required in certain scenarios.

Typically, human drivers exhibit different behavior, preferences, and habits behind the steering wheel (e.g., following distance, sudden vs. gradual braking, sudden vs. gradual acceleration, sharpness of turns, frequency of lane changes, and/or the like). Driving or travelling in a highly automated vehicle allows for minimum human interaction and a human driver can find several advantages such as flexibility of choosing routes on which a commute time can be used for constructive purposes such as reading, and feeling of improved safety. The advantages offered by the highly automated vehicle can far outweigh the unnatural quality of the manual driving, as well as help improve a driving quality of a human driver by providing feedback in real-time or based on historic driving performance.

SUMMARY

According to at least one embodiment of the present disclosure, there is provided a feedback server. The feedback server includes processing circuitry configured to determine an actual driving performance of a driver in a manual driving mode and a projected driving performance if the vehicle had been operated in an autonomous driving mode, compare the driving performance in the manual driving mode and the autonomous driving mode, and transmit a feedback to the driver based on the comparison.

The feedback server can be further configured to determine a driver state of the driver in the manual driving mode, determine an environmental driving condition of the vehicle, and establish a baseline behavior of the driver as a function of the driver state and the environmental driving condition. The feedback server cart be further configured to prompt the driver to switch to the autonomous driving mode in real-time, and display the feedback report in real-time on the external device.

Further, according to at least one embodiment of the present disclosure, there is provided a method of providing a driving feedback for an autonomous vehicle. The method includes determining, using processing circuitry, a driving performance in a manual driving mode and corresponding navigation data, determining, using the processing circuitry, a driver state in the manual driving mode, and determining, using the processing circuitry, environmental conditions. The method further includes comparing, using the processing circuitry, the driving performance in the manual driving mode against an autonomous driving mode, recording, using the processing circuitry, differences in the driving performance and generate a feedback report, providing, using the processing circuitry, instructions for improvements in the driving performance, and transmitting, via network, the feedback report to an external device.

Further, according to at least one embodiment of the present disclosure, there is provided a feedback system for an autonomous vehicle. The feedback system includes at least one of a heart rate sensor, a blood pressure sensor, a Doppler radar and a camera vision system to determine a driver's state, and at least one of a radar sensor, a lidar sensor and camera sensor to determine an environmental driving condition. Further, the feedback system includes processing circuitry configured to determine an actual driving performance of a driver in a manual driving mode as a function of the determined driver state and the determined environmental driving condition and a projected driving performance if the vehicle had been operated in an autonomous driving mode, compare the driving performance in the manual driving mode and the autonomous driving mode, and transmit a feedback to the driver based on the comparison.

The feedback system can also be further configured to establish a baseline behavior of the driver as a function of the driver state and the environmental driving condition.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "proximate," "minor," and similar terms generally refer to ranges that include the identified value within a margin of 20%, 10% or preferably 5% in certain embodiments, and any values therebetween.

Figure 1:
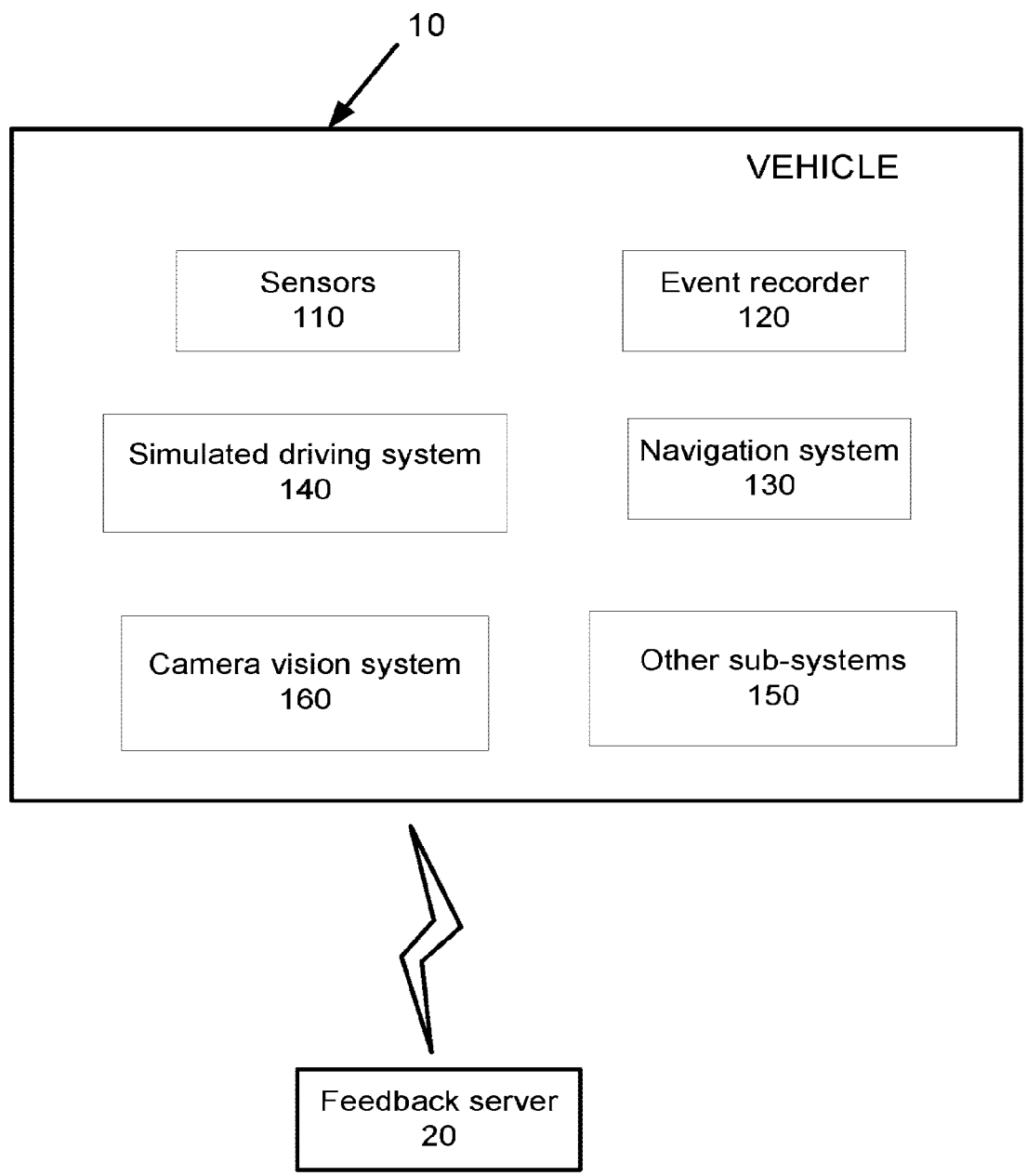
FIG. 1 illustrates a block diagram of systems installed on a vehicle according to an exemplary embodiment of the present disclosure.

FIG. 1 illustrates a block diagram of systems installed on a vehicle according to an exemplary embodiment of the present disclosure. A vehicle 10 can be a highly automated vehicle or an autonomous vehicle. The autonomous vehicle may include all of the features of a non-autonomous vehicle, for example: a steering system such as a steering wheel; a navigation system and a driving mode selector system with a mode shifter. The vehicle may also have various user input devices, such as a mode shifter, a touch screen or button inputs for activating or deactivating one or more autonomous driving modes and for enabling a driver (or a passenger) to provide information such as a navigation destination to a navigation system.

In one embodiment of the present disclosure, the vehicle 10 includes one or more sensors 110, an event recorder 120, a navigation system 130, a simulated driving system 140, a camera vision system 160, and other sub-systems 150. The vehicle 10 is equipped to communicate with a feedback server 20 in real-time (i.e., while the vehicle 10 is in motion) or offline while the vehicle 10 is not in motion).

The vehicle 10 can be equipped with various types of sensors 110. The vehicle 10 can be equipped with a geographic position component such as a GPS receiver to determine the device's latitude, longitude and/or altitude position, an accelerometer, a gyroscope or other direction/speed detection devices to determine the direction and speed of the vehicle or changes thereto. Furthermore, the vehicle may also include components for detecting objects and conditions external to the vehicle such as other vehicles, obstacles in the roadway, traffic signals, signs, trees, etc. The detection system may include lasers, sonar, radar detection units (such as those used for adaptive cruise control), cameras, or any other detection devices which record data and send signals to an electronic control unit (ECU) or the feedback server 20. Furthermore, the autonomous vehicle can be equipped with a DSRC (direct short range communication) sensor, and AV (autonomous vehicle) penetration sensor, that allow detection of other autonomous vehicles within the range of the sensors and also enable communication with other autonomous vehicles.

The aforementioned sensors 110 carp allow the vehicle to understand and potentially respond to its environment in order to maximize safety for passengers, as well as to detect and respond to objects or people in the environment. It will be understood that the vehicle types, number and type of sensors, the sensor locations, the sensor fields of view, and the sensors' sensor fields are merely exemplary. Various other configurations may also be utilized.

Furthermore, the sensors 110 described above can also receive inputs from sensors installed on a non-autonomous vehicle. For example, such sensors may include tire pressure sensors, engine temperature sensors, brake heat sensors, brake pad status sensors, tire tread sensors, fuel sensors, oil level and quality sensors, air quality sensors (for detecting temperature, humidity, or particulates in the air), precipitation sensors for automatic windshield wipers, etc.

Additional, the sensors 110 can include several sensors to detect a physiological state of a driver. For example, sensors to detect physiological state include but not limited to light detection and ranging (LIDAR), the camera vision system 160, ultrasonic, long range and short range radars (e.g., a 24 GHz radar sensor), wearable devices equipped to monitor physiological state such as FITBIT™, healthcare devices that monitor blood pressure, heart rate, respiratory rate, posture, temperature, glucose level, etc. The camera vision system 160 can also be used to monitor driver behavior in the vehicle 10, distractions such as kids, noise inside the vehicle, movies, phone usage, etc. Furthermore, resistive or capacitive sensors can be integrated into a steering wheel or a seat to monitor the driver's physiological state such as fatigue, body temperature, heart rate, position, etc. Based on the driver's state, the feedback server 20 can provide instructions to switch to an autonomous driving mode from a manual driving mode.

The event recorder 120 can record information such as braking, acceleration, turning, traffic, accidents, road events, etc. Alternatively, or in addition, the event recorder 120 can be in communication with sensors 110 including but not limited to a camera, a video recorder, audio recorders, accelerometers, gyroscopes, vehicle state sensors, GPS, outdoor temperature sensors, moisture sensors, laser line tracker sensors, radar, or any other appropriate sensors. Alternatively, or in addition, the event recorder 120 can record data from the sensors 110 including but not limited to the physiological state sensors, a speedometer, an acceleration sensor, a brake sensor, an engine revolutions per minute (e.g., RPM) sensor, an engine temperature sensor, a headlight sensor, an airbag deployment sensor, driver and passenger seat weight sensors, an anti-locking brake sensor, an engine exhaust sensor, an gear position sensor, a cabin equipment operation sensor, or any other sensors to detect a vehicle state. The event recorder 120 can include circuitry for processing sensor data and detecting events, map data, and circuitry for detecting risky behavior, etc.

The navigation system 130 can determine different routes between a start location and a destination. The navigation system 130 can also record a route selected by a user (e.g., a driver or a passenger) and associated data such time, road events, traffic, etc. The navigation system 130, the ECU or the feedback server 20 can receive or transfer information to and from other computers. For example, a map stored on the feedback server 20 may be received or transferred from the feedback server 20 to the navigation system 130; the sensor data collected from the sensors of the autonomous vehicle can be transmitted to the feedback server 20 for processing. As such, sensor information, and navigation related functions (described with reference to FIGS. 2 and 3) can be implemented using a central architecture, where the information from aforementioned sensors and the navigation related functions are processed by a single controller such as the ECU. Alternatively, a distributed architecture can be used, in which the aforementioned functions are processed partially by the navigation system 130 and partially by the feedback server 20.

The simulated driving system 140 is designed to simulate driving and autonomous control systems to establish an autonomous driving performance in the autonomous driving mode. The autonomous driving performance can be established based on data received from driver assistance sub-systems, the camera vision system 160, the event recorder 120 and the sensors 110 installed on the vehicle 10. A driver's actual performance can be measured in comparison to the autonomous driving performance in the autonomous driving mode obtained from the simulated driving system 140. The driver assistance sub-systems can include one or more of the following: a lane keeping system, a following distance system, or any other appropriate driver assistance system.

Furthermore, the other sub-systems 150 can be sub-systems related to driver assistance or autonomous control of the vehicle 10. For example, a braking and acceleration control sub-system, and a steering control sub-system to control the movement, speed, etc., of the vehicle 10. The other sub-systems 150 can also communicate with various components of the vehicle such as the vehicle's conventional ECU (not shown) and can send and receive information from various systems and sensors 110 of the vehicle 10.

The event recorder 120, the simulated driving system 140, the navigation system 130, feedback sever 20 and the other similar systems or sub-system comprise processing circuitry for controlling operation of aforementioned systems, for reading and writing information, for short distance communication, wireless communication, for reading data via sensor interface, for data storage, and other electronic components to support operation of the systems. An exemplary hardware for the feedback server 20 is discussed with respect to FIG. 5. A controller (for example, a CPU 400 of the feedback server 20) or processing circuitry such as the event recorder 120, the simulated driving system 140, and the like includes a programmed processor. The processing circuitry or controller may also include devices such as an application specific integrated circuit (ASIC) and conventional circuit components arranged to perform the recited functions. The processing circuitry or controller can be a part of the feedback server 20 as discussed in more detail with respect to FIG. 5. Each of the functions of the described embodiments (with reference to FIGS. 2 and 3) can be implemented by one or more processing circuits or controllers.

Figure 2:
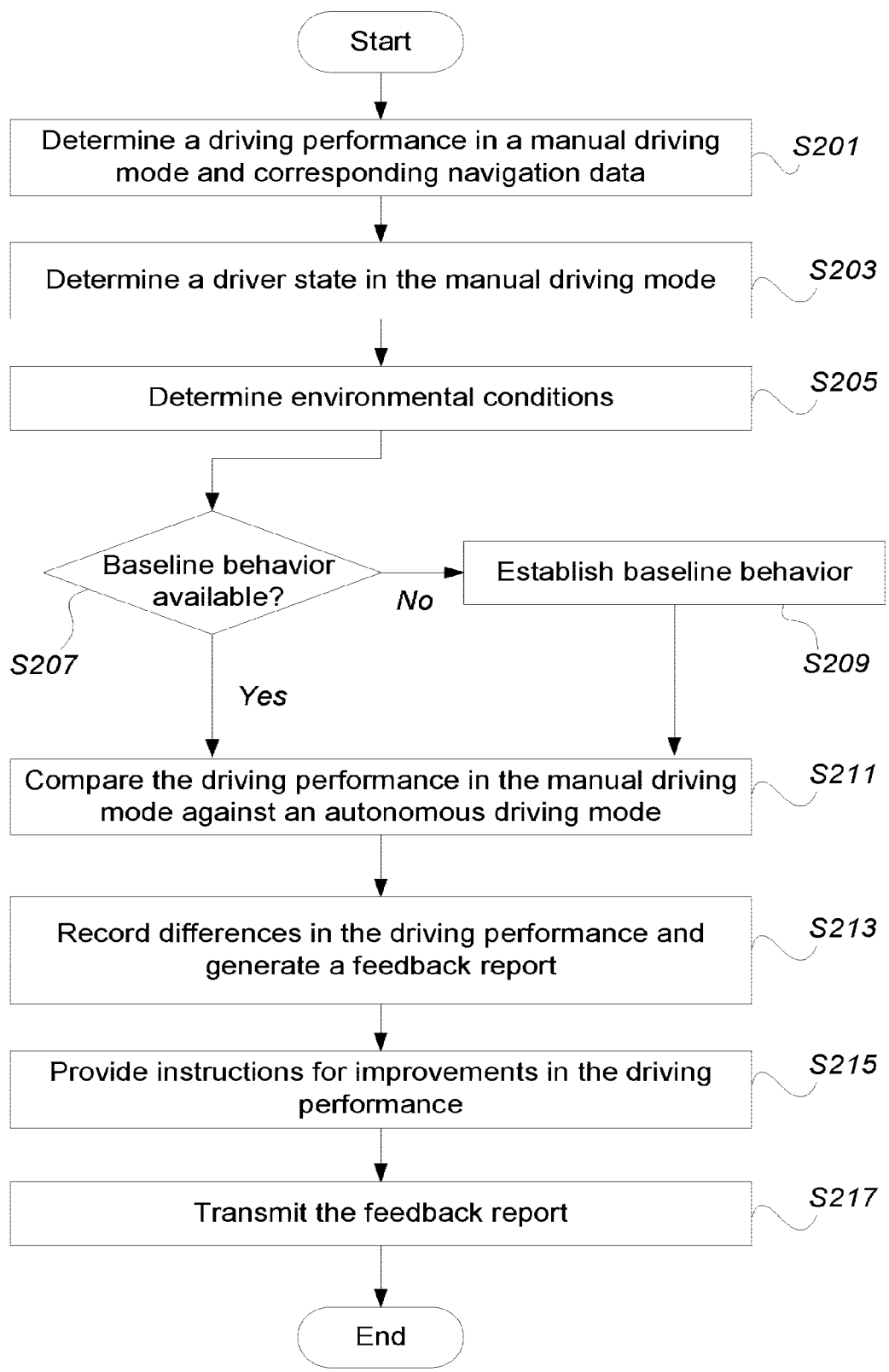
FIG. 2 is a flow chart of a first process performed by a feedback server according to an exemplary embodiment of the present disclosure.

FIG. 2 is a flow chart of a first process performed by the feedback server 20 according to an exemplary embodiment of the present disclosure. The first process provides an offline feedback, i.e., post driving, related to the driving, performance in the manual driving mode and recommends scenarios where switching to the autonomous driving mode would be desirable or improve the driving performance. The first process is performed when a trip completes. A feedback report can be requested by the driver or an employer of the driver, or automatically generated.

In step S201, a driving performance of the driver when driving in the manual driving mode is determined. The feedback server 20 determines the driving performance based on actual trip information received from the event recorder 120, the navigation system 130, the sensors 110, or a combination thereof. The driving performance can be measured in terms of lane keeping, longitudinal braking, time to collision, turn speed, fuel efficiency, route efficiency, ability to merge onto exit ramps, etc.

The actual trip information used to determine the driving performance can include a first route taken by the driver from the start location to the destination. Along the first route, the feedback server 20 can extract data from the event recorder 120 and the navigation system 130 including data related to vehicle condition, braking/acceleration, turning, route followed, data indicating environmental conditions, a driver state, traffic details, etc.

The driving performance can also be recorded or determined when the vehicle is operated in the autonomous driving mode as well. Further, the driver state can be evaluated while operating in the autonomous driving mode.

In step S203, a driver state in the manual driving mode is determined. The driver state can be a psychological state or a physiological state. A physiological state refers to a condition or state of a body or bodily function of a driver when driving the vehicle 10, while the psychological state refers to a mental state or emotional state of the driver.

The feedback server 20 can determine the physiological states of the driver based on the data received from the event recorder 120, the sensors 110, or a combination thereof. For instance, the sensors 110 can include a heart rate sensor installed on a steering wheel or a seat belt. The heart rate sensor end a driver's heart rate to the feedback server 20 or the event recorder 120. Based on the heart rate, the feedback server 20 can determine if the driver is stressed, functioning normal, sleeping, etc. The physiological states of the driver such as sleepy, drowsy, stressed, attentive, distracted, etc. can also be determined lasing the camera vision system 160 installed on a dashboard that tracks the driver's eye movement, body position, passenger movements, passenger's body position, noise level inside the vehicle, etc. Processing circuitry can be configured to process data recorded by the camera or other physiological sensors to determine the physiological state of the driver. For example, if there are passengers such as kids on the back seat of the vehicle 10, they may need attention, as kids often make noise, try to move around, try to take off seat belt, etc. Such passenger activities can be distracting to the driver and may cause the driver to turn their attention to the back seat more often than under normal driving conditions. The driver may also be distracted when texting, or talking on the phone while driving. Such distracted states of the driver can be determined by the camera vision system 160.

The physiological state of the driver can also be determined based on an event derived from the event recorder 120. For instance, sudden braking or sudden acceleration, high speed or low speed can be a response indicative of a startled or a scared physiological state.

In one embodiment, the driver state can also be recorded or determined when the vehicle is operated in the autonomous driving mode. Such a driver state can indicate the advantage of switching from the manual driving mode to the autonomous driving mode. For example, the driver may become more relaxed or less stressed, his/her heart rate or blood pressure may become normal, etc. Some driver states in the autonomous driving mode can be treated differently than when the vehicle is operating in a manual mode. That is, some driver states are acceptable in the autonomous mode but unlawful in the manual mode (e.g., driving while texting). Those states can be ignored or used to assign a positive or negative score to the driver. For example, texting when in the autonomous driving mode can be ignored.

In step S205, the feedback server 20 determines environmental conditions based on the sensors 110, the navigation system 130 and other sub-systems 150 configured to capture environment related data. For example, the environmental conditions such as a traffic jam, a road block, an animal like a cow crossing the road, heavy rain, icy conditions, etc. can be determined. The environmental conditions can cause a driver to be stressed, be more attentive, cause an accident due to lack of attention, or other driving related problems. The driver state and/or the driving performance can be correlated to environmental conditions, for example, stress related to traffic and lane keeping due to rain.

In step S207, the feedback server 20 checks whether a baseline behavior of the driver is available. If the baseline behavior of the driver is available, the process executes step S211. If the baseline behavior of the driver is not available, in step S209, the feedback server 20 establishes the baseline behavior for the driver.

The baseline behavior establishes a normal driving behavior pattern (also referred as a norm) of the driver based on a past driving performance of the driver. The baseline behavior is established by collecting driving performance, driver state, and other driving related data (including environmental driving conditions) over a period of time (e.g. 21 days). The baseline behavior can vary from person to person. The baseline behavior can vary based on factors such as an age of the driver, a time of the day, traffic conditions, passengers in the vehicle such as kids, friends, and family member, a holiday, a workday, etc. Further, the baseline behavior can be a single behavior based on one factor or a cluster of behaviors based on a combination of factors. For instance, the cluster of behaviors can be created by classifying behavior into different types based on the time of the day, the traffic condition, passengers, or a combination thereof.

The baseline behavior can also be a function of establishing, correlations between a physiological state of a driver and environmental conditions, performance or both. For example, stress and heart rate can be correlated to traffic conditions, accident, collision avoidance, lane keeping, etc. Also, correlation can be established between a psychological state such as being happy, angry, sad, etc. For example, a happy state can be correlated to speed, a song driver is listening to, a holiday, etc.

Alternatively or in addition, a standard baseline behavior can be established based upon driving performance, driver state and other driving related data collected for different drivers over a period of time. The driving data from different drivers can be correlated to identify driving patterns and corresponding driving behavior of each driver to establish the standard baseline behavior. The standard baseline behavior can also correlate driving incidents such as accidents, running a red light, etc. with the driving performance and the driver state to establish a proper driving behavior. Such a proper driving behavior can be used to recommend proper actions the driver must take (e.g., switching to autonomous driving mode) to prevent occurrence of undesirable driving incidents.

One or more factors of the baseline behavior can be measured using the sensors 110, the camera vision system 160, the navigation system 130, or a combination thereof. The measurements received can be stored in the database of the feedback server 20 and can be retrieved as needed to build the baseline behavior. The baseline behavior can be qualitative, or quantitative based on statistical models.

To distinguish different baseline behaviors consider the following examples. First, a baseline behavior of a first driver can be established during a morning commute to work. The system can sense whether the first driver is tense, and determine whether the first driver brakes/accelerates hard, changes lane too many times, drives above the speed limits, and/or has an elevated heart rate and blood pressure, etc. Similarly, a baseline behavior of a second driver can be established during the morning commute to work. The system may sense that the second driver is relaxed, and determine that the driver brakes/accelerates smoothly, stays in the lane, drives within the speed limits, has a regular heart rate and blood pressure, etc.

In certain conditions such as heavy traffic starting a commute earlier than normal, a busy work day, a relaxed work day, etc. may affect the behavior of the driver, and as such the driver may deviate from the norm. When the system determines that a driver has deviated from the norm, the system can recommend to the driver to switch to the autonomous driving mode. Certain deviations from the noun may be acceptable or desirable, while others may be undesirable or unacceptable. For example, the first driver driving in a relaxed state (a deviation from the driver's normal tensed state) may be acceptable. On the other hand, the second driver driving in a tensed state (a deviation from that driver's normal relaxed state) may be undesirable and trigger a recommendation from the system to change to an autonomous driver mode.

Figure 3:
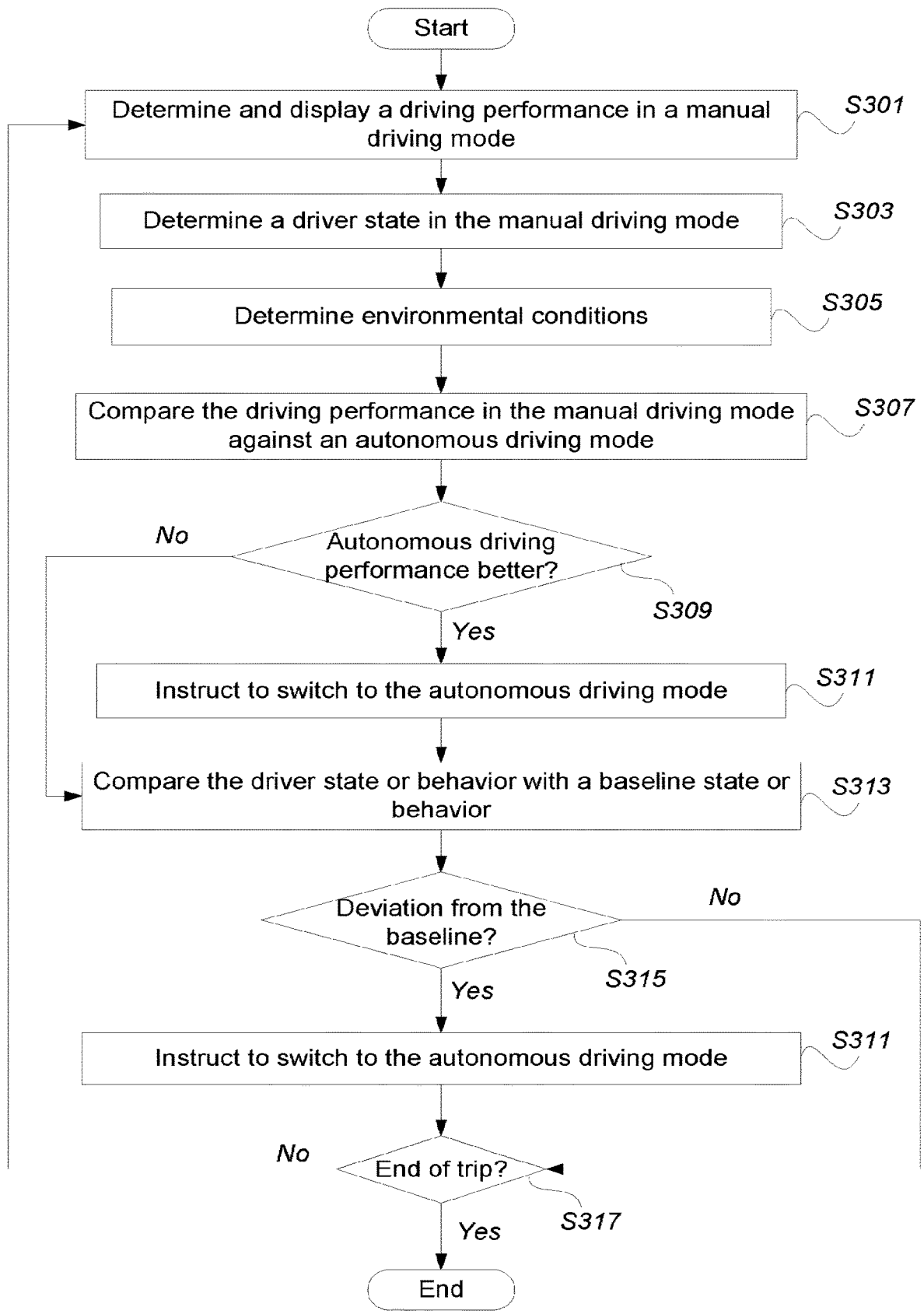
FIG. 3 is a flow chart of a second process performed by the feedback server according to an exemplary embodiment of the present disclosure.

The steps S207 and S209 can be omitted, performed separately (e.g., prior to executing the first process (See FIG. 2)), or in parallel to the first process or a second process (See FIG. 3).

In step S211, the driving performance in the manual driving mode is compared with the driving performance in the autonomous driving mode. The driving performance in the autonomous mode can be derived from simulated driving information received from the simulated driving system 140. The simulated driving system 140 is designed to take an optimum route and simulate an autonomous behavior (or a preferred behavior) of the driver along the optimum route while taking into account real-time events environmental conditions, traffic details, etc. to adjust the autonomous behavior of the driver to obtain a more realistic behavior estimate.

In case the driver takes a first route which is different from the optimum route, the simulated driving system 140 can simulate the behavior of the driver along the first route for comparison purposes. The autonomous behavior can be established based on driving the vehicle 10 through several routes by an experienced driver, or using a theoretical driving model.

The comparison can include comparing the driving performance and/or driver State in a present trip with the baseline behavior of the driver. For example, as pointed out above, the driver state of the second driver may be sensed as being tense because he/she is late for work. As such, the driving performance may deviate from the norm. For comparison purposes, the feedback server 20 can divide the trip in to multiple segments from start to destination. A segment is a part of a route that is measured in terms of time, or distance. The segment can be divided based on a specific distance, time, environmental factors, traffic conditions, automation characteristics of a vehicle, etc. For example, the first route taken by the driver can be divided into multiple time steps or road segments of uniform or non-uniform length. For example, for the first route of 100 miles, a first road segment can be 2 miles long, a second road segment can be 20 miles long, a third road segment can be 5 miles long, and so on. Similar to the first route, the second and the optimum route can be divided into multiple time steps or road segments. The time steps or the road segments can be of uniform length or non-uniform length. Further, the length of the segment for the first route can be approximately equal to a corresponding segment of the second route or the optimum route. For each segment, a comparison of driving performance in the manual driving mode as opposed to the autonomous driving mode can be performed and the results can be stored in a database to generate feedback reports.

In step S213, the feedback server 20 records the differences in the driving performance in the manual driving mode and the autonomous driving mode and generates a feedback report. The feedback report can include various factors such as the driver state, heart rate, stress levels, point of deviation from optimum route, lane departures, braking/acceleration efficiency, fuel efficiency, suggestions about switching to autonomous driving mode in certain situations, a numerical value (e.g., a driver score) computed based on the driving performance in the manual mode, and other relevant comparison based suggestions to improve the driving performance of the driver. The numerical value can be an aggregation of score assigned to a particular factor of comparison such as lane keeping, hard braking/acceleration, speeding, etc. over a period of time. The numerical value can be a percentage, a ranks or a number. For example, a percentage of lane keeping when driving in the manual driving mode compared to in the autonomous driving mode can be computed.

In step S215, the feedback server 20 provides instructions for improvement in the driving performance. The instructions or suggestions can be included in the feedback report. For example, the feedback report can include statements with numerical values such as "if the driver had utilized the autonomous driving mode, he/she could have been 15% better at lane keeping". In another example, the feedback report can include a recommendation to switch to the autonomous mode in certain circumstances such as during heavy traffic conditions or when the driver state is not the nor, for example, when it is sensed or determined that the driver is distracted, stressed, tired, drowsy, inattentive, etc. Another suggestion can be to regulate the braking/acceleration, staying in lane, etc., which may in turn prove the fuel and route efficiency. In another example, the feedback report can be generated daily indicating a baseline behavior over several days at a particular time of the day and highlighting any instances or particular feedback when the driving performance is outside the baseline behavior. For example, the feedback report can indicate that the driver's heart rate or stress level over a past 10 days around 6 p.m. was normal; however, today the heart rate or the stress level is higher than the baseline although there was no substantial change in the external conditions such as traffic or environmental driving condition. Such a feedback report can be help the driver identify any health related issued or factors other than driving that caused deviation from the baseline behavior.

In step S217, the feedback server 20 transmits the feedback report to an external device, possibly via a network. The external device can be a display installed in a vehicle, a smart phone, tablet, computer, laptop, etc.

FIG. 3 is a flow chart of a second process performed by the feedback server 20 according to an exemplary embodiment of the present disclosure. The second process provides a real-time feedback related the driving performance in the manual driving mode and recommends switching to the autonomous driving mode, if necessary. In one embodiment, the second process starts when a trip in the vehicle 10 starts. Several of the steps from the first process can be performed in the second process as well. For instance, determining the driving performance, the driver state, and environmental conditions, in order to compare with the baseline behavior of the driver can be done real-time.

In step S301, the driving performance of the driver driving in the manual driving mode can be determined using the sensors 110 installed in the vehicle 110. The driving performance can be determined in a similar manner as discussed earlier in step S201 of the first process. In the second process, the driving performance is continuously monitored and analyzed in real-time using data from the sensors 110, the navigation system 130, etc. Furthermore, the driving performance can be displayed on an external device in real-time. For example, referring to FIG. 4 (discussed in more detail below), a travel path in the manual driving mode and in the autonomous driving mode can be displayed to provide a real-time feedback to the driver, which may help in improving future driving performance.

In step S303, the driver state in the manual driving mode can be determined using the sensor 110 data of the vehicle. The driver state can also be determined based on the driver behavior within the cabin of the vehicle 10. The driver state can be determined in a similar manner as discussed earlier with respect to step S203 of the first process. For example, a stress level, heart rate, blood pressure, distractions inside the vehicle, etc. can be continuously monitored and analyzed in real-time by the feedback server 20. The driver state can also be determined when the vehicle is operated in the autonomous driving mode.

In step S305, the feedback server 20 can determine environmental conditions based on the sensors 110, the navigation system 130 and other sub-systems 150 configured to capture environment related data similar to step S205 of the first process.

In step S307, the driving performance in the manual driving mode can be compared with the driving performance in the autonomous driving mode. The comparison can be conducted continuously or periodically. The comparison can be similar to that performed in step S211 of the first process. Further, various driver states can be compared with the baseline behavior in real-time. For example, the stress level, heart rate, etc. can be compared with the baseline behavior where the environmental conditions are similar. If the stress level increases due to reasons such as increased traffic, collision avoidance, or distractions an instant notification can be made.

A numerical value can be assigned to different factors of comparison such as stress level, heart rate, distance to collision, etc. to provide a quantitative basis of comparison. For instance, if the stress level increases due to traffic, a negative value can be assigned to the stress level, which can be indicative of poor performance in the manual driving mode compared to the autonomous driving mode. One or more factors can be continuously monitored and compared in real-time.

In step S309, the feedback server 20 determines whether the driving performance in the autonomous driving mode is significantly better than that in the manual driving mode. If the driving performance in the autonomous driving mode is better, the feedback server 20 transmits a message recommending a switch to the autonomous driving mode, in step S311. For example, the driving performance in the manual driving mode may include lane departures, and hard braking/acceleration; while in the autonomous driving, mode such factors may show no lane departure and smooth braking/acceleration. As such, the feedback server 20 can prompt the driver to switch to the autonomous driving mode. If the driving performance would not be significantly improved, the process continues to step S313.

In step S313, the driver state or behavior is compared to the baseline behavior of the driver. The comparison between the current driver state and the driver's baseline behavior can help to predict future driving performance. Accordingly, a suggestion or recommendation to switch to autonomous driving mode can be made based on the comparison. For example, the driver may have an increased stress level due to increased traffic; however the monitored stress level of the driver may match a baseline behavior of the driver and a switch to the autonomous mode is unwarranted. In another scenario, the driver may have an increased heart rate, may be drowsy, or happier relative to the driver's baseline behavior while the environmental driving conditions remain significantly unchanged. In such a case, a deviation from norm is detected and a switch to the autonomous mode will be recommended. On the other hand, certain situations can also arise where driving in the autonomous mode may not be appropriate and the system can recommend driving in manual driving mode. For example, traffic may be redirected due to an incident such as an accident or construction activity. In such a situation, the system can recommend driving in manual driving mode as the driver may need to follow directions provided by police officers, traffic controllers, or other drivers.

In step S315, the feedback server 20 determines whether the driver deviates from the baseline driver state or behavior. If a deviation from the norm is detected, the feedback server 20 will prompt the driver to switch to the autonomous driving mode. The prompt may be merely a recommendation to switch to the autonomous driving mode which the driver may decline if the driver is uncomfortable switching to autonomous driving mode. As such, the driver can ignore the recommended instruction and continue driving in the manual driving mode. In another scenario, a detected increased heart rate coupled with unchanged environmental conditions would result in the feedback server 20 prompting the driver to adjust his/her driving in the manual driving mode.

In step S317, the feedback server 20 determines whether the trip has concluded. The end of trip determination can be based on user input, or a signal from the navigation system 130. If the end of trip is not reached, the first process iteratively performs the steps S301 through S313 as discussed earlier. If the end of trip is reached, the first process ends.

Figure 4:
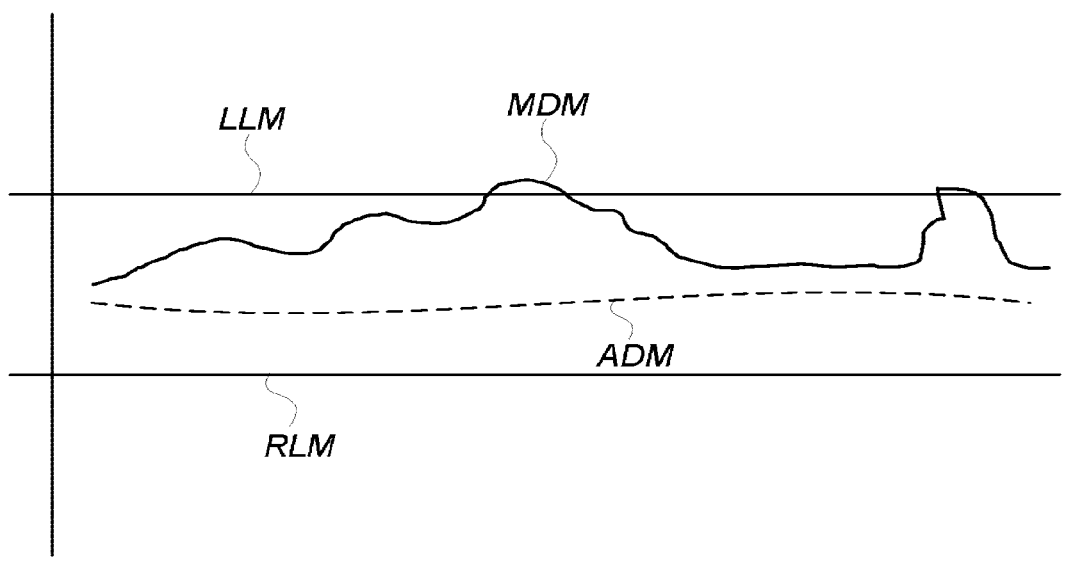
FIG. 4 illustrates an exemplary feedback provided by the feedback server according to exemplary embodiment of the present disclosure.

FIG. 4 illustrates an exemplary feedback provided by the feedback server according to an exemplary embodiment of the present disclosure. Typically, a road includes a left lane marker LLM and a right lane marker RLM. The sensors 110 can monitor lane keeping and a first travel path MDM. The first travel path is a path traveled when driving in the manual driving mode. The first travel path MDM can be determined in real-time by the feedback server 20 ear the ECU of the vehicle, and displayed on the external device. Further, the feedback server 20 can compute and transmit a second travel path ADM, which is a path traveled when driving in the autonomous driving mode. The first travel path MDM and the second travel path ADM can be updated in real-time based on the output of sensors 110. The first travel path MDM indicates that the driver follows an irregular travel path, does not stay in the lane, and crosses the left lane marker LLM a few times. On the other hand, the second travel path ADM is regular with smooth deviations and manages to stay within the lane makers without drifting. A comparison of the two driving paths enables the feedback server 20 to determine whether a recommendation to change to the autonomous driving mode can improve the driving performance in terms of lane keeping as well as travelling in a more efficient path with fewer irregularities.

Figure 5:
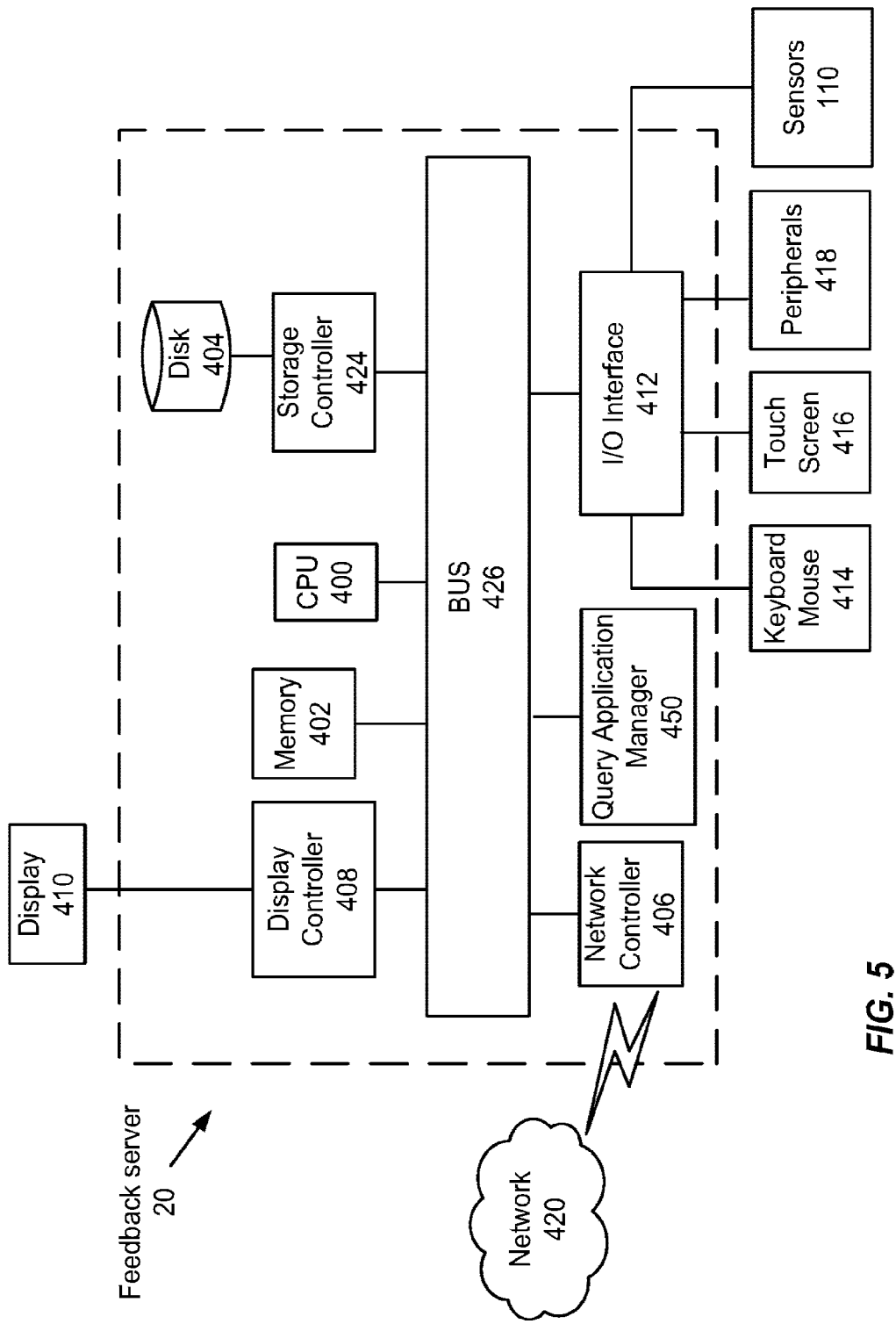
FIG. 5 is a detailed block diagram illustrating hardware of the feedback server according to exemplary embodiment of the present disclosure.

FIG. 5 is a detailed block diagram illustrating an exemplary feedback server 20. In FIG. 5, the feedback server 20 includes a CPU 400 which performs the processes described in the present disclosure. The process data and instructions may be stored in a memory 402. These processes and instructions may also be stored on a storage medium disk 404 such as a hard drive (HDD) or portable storage medium or may be stored remotely. Further, the claimed advancements are not limited by the form of the computer-readable media on which the instructions of the inventive process are stored. For example, the instructions may be stated on CDs, DVDs, in FLASH memory, RAM, ROM, PROM, EPROM, EEPROM, hard disk or any other information processing device with which the feedback server 20 communicates, such as a server or computer.

Further, the claimed advancements may be provided as a utility application, background daemon, or component of an operating system, or combination thereof, executing in conjunction with CPU 400.

The hardware elements in order to achieve the feedback server 20 may be realized by various circuitry elements, known to those skilled in the art. Further, CPU 400 may be implemented as multiple processors cooperatively working in parallel to perform the instructions of the inventive processes described above with respect to FIGS. 2 and 3.

The feedback server 20 in FIG. 5, also includes the network controller 406, such as an Intel Ethernet PRO network interface card from Intel Corporation of America, for interfacing with a network 420. As can be appreciated, the network 420 can be a public network, such as the Internet, or a private network such as an LAN or WAN network, or any combination thereof and can also include PSTN or ISDN sub-networks. The network 420 can also be wired, such as an Ethernet network, or can be wireless such as a cellular network including EDGE, 3G and 4G wireless cellular systems. The wireless network can also be WiFi, Bluetooth, or any other wireless form of communication that is known. The feedback server 20 can communicate with external devices such as the external device via the network controller 406.

The feedback server 20 can further include a display controller 408 for interfacing with display 410. The display 410 can be display of the external device. An I/O interface 412 interfaces with a keyboard and/or mouse 414 as well as a touch screen panel 416 on or separate from display 410. The I/O interface also connects to a variety of peripherals 418 including printers and scanners. The I/O interface can also connect to a variety of sensors 110 as discussed with respect to FIG. 1.

Further, the feedback server 20 can be connected to the external device via I/O interface 412 or through the network 420. The external device can send queries that are handled by a query manager application 450 including extracting data from the disk 404 via the storage controller 424, from the memory 402, or trigger execution of processes discussed in FIGS. 2 and 3.

The storage controller 424 connects the storage medium disk 404 with communication bus 426, which may be an ISA, EISA, VESA, PCI, or similar, for interconnecting all of the components of the feedback server 20. A description of the general features and functionality of the display 410, keyboard and/or mouse 414, as well as the display controller 408, storage controller 424, network controller 406, and the I/O interface 412 is omitted herein for brevity as these features are known.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures. For example, this technology may be structured for cloud computing whereby a single function is shared and processed in collaboration among a plurality of apparatuses via a network.

What is claimed is:

1. A feedback server for an autonomous or highly automated vehicle, comprising:
processing circuitry configured to
determine a driver state of a driver using at least a temperature measurement of the driver provided by a wearable device worn by the driver and an ultrasonic sensor that monitors the driver;
establish a baseline behavior of the driver based on at least the driver state,
determine an actual driving performance of the driver while the driver is driving the vehicle on a driving trip in a manual driving mode and a projected driving performance were the vehicle to be operated in an autonomous driving mode on the driving trip, the determining being based at least in part on the baseline behavior,
compare the actual driving performance of the driver in the manual driving mode on the driving trip with the projected driving performance were the vehicle to be operated in the autonomous driving mode on the driving trip,
transmit feedback to the driver based on the comparison while the driver is driving the vehicle on the driving trip, the feedback including a prompt recommending the driver to switch the vehicle to the autonomous driving mode, and
provide the driver with a feedback report after the driving trip has been completed.

2. The feedback server according to claim 1, wherein
the processing circuitry is further configured to determine an environmental driving condition of the vehicle, and
the baseline behavior of the driver is determined based on the driver state and the environmental driving condition.

3. The feedback server according to claim 2, wherein the processing circuitry is further configured to:
determine the driver state using at least one of a Doppler radar and a camera vision system, and
determine the environmental driving condition using at least one of a radar sensor, a lidar sensor, and a camera.

4. The feedback server according to claim 2, wherein the driver state is correlated to at least one of the actual driving performance and the environmental driving conditions.

5. The feedback server according to claim 1, wherein the processing circuitry is further configured to determine the actual driving performance as a function of least one of lane keeping, fuel efficiency, route efficiency, exit ramp merging, braking, acceleration, and time to collision.

6. The feedback server according to claim 2, wherein the processing circuitry is further configured to determine the driver state as a function of a psychological state of the driver.

7. The feedback server according to claim 2, wherein the establishment of the baseline behavior of the driver occurs in real-time.

8. The feedback server according to claim 2, wherein processing circuitry is further configured to transmit the feedback to the driver when the projected driving performance were the vehicle to be operated in the autonomous driving mode is determined to be superior than the actual driving performance of the driver in the manual driving mode or when the feedback server determines the driver has deviated from the baseline behavior.

9. The feedback server according to claim 1, wherein the processing circuitry is further configured to cause information included in the feedback report to be displayed in real-time on an external device.

10. A method of providing driving feedback for an autonomous or highly automated vehicle, the method comprising:
determining, using processing circuitry, a driver state of a driver of the vehicle using at least a temperature measurement of the driver provided by a wearable device worn by the driver and an ultrasonic sensor that monitors the driver;
establishing, using the processing circuitry, a baseline behavior of the driver based on at least the driver state;
determining, using the processing circuitry, an actual driving performance of the driver while the driver is driving the vehicle on a driving trip in a manual driving mode and a projected driving performance were the vehicle to be operated in an autonomous driving mode on the driving trip, the determining being based at least in part on the baseline behavior;

comparing, using the processing circuitry, the actual driving performance of the driver in the manual driving mode on the driving trip with the projected driving performance were the vehicle to be operated in the autonomous driving mode on the driving trip;

transmitting, via network, feedback to the driver based on the comparison while the driver is driving the vehicle on the driving trip, the feedback including a prompt recommending the driver to switch the vehicle to the autonomous driving mode; and providing the driver with a feedback report after the driving trip has been completed.

11. The method according to claim 10, further comprising:

determining, using the processing circuitry, an environmental driving condition of the vehicle, wherein the baseline behavior of the driver is determined as a function of the driver state and the environmental driving condition.

12. The method according to claim 11, wherein the driver state is correlated to at least one of the actual driving performance and the environmental driving condition.

13. The method according to claim 10, wherein the actual driving performance is determined as a function of least one of lane keeping, fuel efficiency, route efficiency, exit ramp merging, braking, acceleration, and time to collision.

14. The method according to claim 11, wherein the driver state is further determined as a function of a psychological state of the driver.

15. The method according to claim 10, wherein the transmission of the feedback to the driver occurs when the projected driving performance were the vehicle to be operated in the autonomous driving mode is determined to be superior than the actual driving performance of the driver in the manual driving mode or when the feedback server determines the driver has deviated from the baseline behavior.

16. A feedback system comprising:

a wearable temperature sensor worn by a driver to determine a driver state based on a temperature of the driver;

an ultrasonic sensor to determine an environmental driving condition;

processing circuitry configured to establish a baseline behavior of the driver based on at least the driver state, determine an actual driving performance of the driver while the driver is driving a vehicle on a driving trip in a manual driving mode as a function of the determined driver state and the determined environmental driving condition and a projected driving performance were the vehicle to be operated in an autonomous driving mode on the driving trip, the determining being based at least in part on the baseline behavior, compare the actual driving performance of the driver in the manual driving mode on the driving trip with the projected driving performance were the vehicle to be operated in the autonomous driving mode on the driving trip, transmit feedback to the driver based on the comparison while the driver is driving the vehicle on the driving trip, the feedback including a prompt recommending the driver to switch the vehicle to the autonomous driving mode, and provide the driver with a feedback report after the driving trip has been completed.

17. The feedback system according to claim 16, wherein the baseline behavior of the driver is determined as a function of the environmental driving condition.

* * * * *